United States Patent [19]

Yamashita

[11] Patent Number: 4,732,070

[45] Date of Patent: Mar. 22, 1988

[54] ELECTRONIC BASS DRUM WITH INTEGRAL SUPPORTS

[75] Inventor: Toshinori Yamashita, Hamamatsu, Japan

[73] Assignee: Nippon, Sakki, Seizo, Kabushiki, Kaisha, Hamamatsu, Japan

[21] Appl. No.: 916,834

[22] Filed: Oct. 9, 1986

[30] Foreign Application Priority Data

Oct. 16, 1985 [JP] Japan .......................... 60-157067[U]

[51] Int. Cl.[4] .................... F16M 11/26; G10D 13/02; G10H 3/12

[52] U.S. Cl. ...................................... 84/1.04; 84/421; 84/422 R; 84/DIG. 12; 248/188.5

[58] Field of Search ...................... 84/327, 411 R, 412, 84/421, 422 R, 1.04, 1.06, 1.14, DIG. 12; 248/188.5, 188.6, 188.7

[56] References Cited

U.S. PATENT DOCUMENTS

| | | | |
|---|---|---|---|
| 3,748,367 | 7/1973 | Lamme et al. | 84/1.04 |
| 3,855,946 | 12/1974 | Bales | 248/188.5 |
| 4,177,709 | 12/1979 | Adams | 84/421 X |
| 4,186,644 | 2/1980 | Kurosaki | 84/422 R |
| 4,297,953 | 11/1981 | Shy | 248/188.6 X |
| 4,315,466 | 2/1982 | Boerigter | 248/188.5 X |
| 4,469,004 | 9/1984 | Kurosaki . | |
| 4,531,443 | 7/1985 | Gillis, Jr. | 84/421 X |
| 4,606,525 | 8/1986 | Lombardi | 248/188.5 X |

FOREIGN PATENT DOCUMENTS 3503871 10/1985 Fed. Rep. of Germany .

*Primary Examiner*—Stanley J. Witkowski
*Attorney, Agent, or Firm*—Blakely Sokoloff Taylor & Zafman

[57] ABSTRACT

An electronic bass drum is mainly constructed by two front legs which stand substantially vertically and are parallel to each other, two rear legs whose one ends are connected to the front legs and whose other ends extend obliquely downward, a pad whose back surface is fixed to the front legs and whose front surface is striken by a player and a pickup which is attached to the back surface. The pickup detects a vibration of the pad caused by the player's strike and outputs a detection signal representing electrically the vibration. Drum sound is realized by driving a sound source such as a PCM sound source, a FM sound source in response to the detection signal.

8 Claims, 5 Drawing Figures

ELECTRONIC BASS DRUM WITH INTEGRAL SUPPORTS

BACKGROUND OF THE INVENTION

The present invention relates to an electronic bass drum and, more particularly, to a floor installation type electronic bass drum.

An electronic bass drum of this type stands substantially vertically on a floor surface 100, and a beaten member 110 is beaten by a beater which is pivoted upon depression of a foot pedal (not shown), as shown in, e.g., in FIG. 1. A vibration of the beaten member 110 is converted into an electrical signal by a pickup device 111, such as a piezoelectric member or the like, so that a musical tone (electronic tone) generating operation in a known electronic sound source apparatus (a PCM or FM sound source; not shown) is effected in response to the output of the electrical signal, thereby generating a percussive sound (e.g., bass drum sound) from a loudspeaker (not shown).

In the conventional electronic bass drum of this type, the beaten member 110 is housed in a hole formed in the central portion of a plate member 115 as an instrument housing, and is fixed thereto by an appropriate metal fixing member. Legs 120 and 125 for vertically supporting the plate member 115 are mounted on the lower portion of the plate member 115 housing the beaten member 110. The leg 120 has a wide L shape, and its one end is fixed to the back surface of the plate member 115 and its other end extends toward the beater (not shown). The leg 125 extends obliquely from the back surface of the plate member 115. When the beaten member 110 is beaten by the beater in the drum having this arrangement, a large force is applied to a connecting portion between the plate member 115 and the legs 120 and 125, and the connecting portion cannot reliably withstand the beating force of the beater. As a result, one or both of the legs may often be bent, removed, or distorted.

As a means for solving this problem, the rigidity and mechanical strength of the instrument housing and the legs can be increased, and the legs can be fixed firmly. However, the weight and the manufacturing cost of the electronic bass drum itself then increase, and its transportation becomes cumbersome.

SUMMARY OF THE INVENTION

It is therefore a principle object of the present invention to provide an electronic bass drum which can stably support a beaten member and withstand the beating force of a beater.

It is another object of the present invention to provide an electronic bass drum in which an electrical signal from a pickup device is free from the influence of an unnecessary vibration from leg portions.

According to an aspect of the present invention, there is provided an electronic bass drum comprising: supporting means constituted by a front supporter which stands substantially vertically, and by a rear supporter whose one end is connected to the front supporter and whose other end extends obliquely downward; pad means, a back surface of which is fixed to the front supporter and a front surface of which is striken by a player; and detecting means attached to the back surface for detecting a vibration of the pad caused by the player's strike and for outputting a detection signal representing electrically detected vibration, the front supporter extending downward further than a lower end of the pad.

DESCRIPTION OF THE PREFERRED EMBODIMENT

Figure 1:
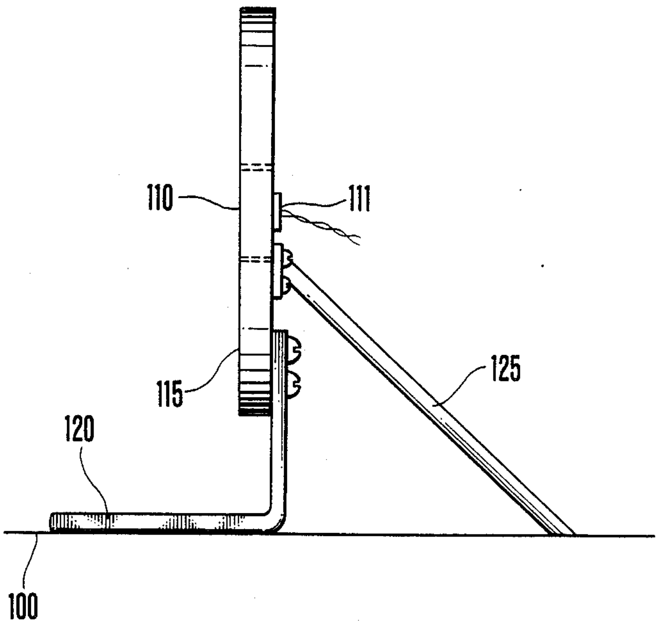
F I G. 1 PRIOR ART
FIG. 1 is a side view showing a conventional typical electronic bass drum.

The present invention will now be described in detail with reference to the accompanying drawings.

In an electronic bass drum according to an embodiment of the present invention shown in FIGS. 2 to 5, an electronic bass drum 1 has front and rear casings 2 and 3 which consist of plastic molded members capable of being divided into halves vertically and have a disk-like shape as a whole. The casings 2 and 3 are integrally coupled to each other at their opening ends to constitute a drum housing 4 for accommodating a pad 5 serving as a beaten member. The front and rear casings 2 and 3 are coupled at their upper, lower, left, and right positions using combinations of substantially U-shaped connecting metal members *6a* and *6b* and screws. An opening 7 is formed in the central portion of the front casing 2, so that it has a slightly smaller diameter than that of the pad 5 and the central surface portion of the pad 5 is inserted therein. The opening 7 is closed by the pad 5 from the inside of the housing 4.

The pad 5 comprises a flexible pad main body 8 and a core member 9. The surface layer portion of the main body 8 consists of a film-like non-foamed layer 8A and the inside thereof consists of a foamed layer 8B. The core member 9 is formed integrally on the back surface of the main body 8 by insert molding, and consists of wood or metal. The thickness of the non-foamed layer 8A at its surface side is set to be 0.1 mm to 1.0 mm in accordance with the size of the pad 5, and preferably, to be 0.1 mm to 5 mm. A pickup device 10, such as a piezoelectric element, for picking up and converting the vibration of the pad 5 into an electrical signal is fixed to the central portion of the back surface of the core member 9. The pad 5 with the arrangement as described above is fixed to the surface of the upper end portion of a front leg 11 for supporting the drum housing 4 substantially vertically on the floor surface together with a pair of left and right legs 28 and 29 (to be described later), thereby closing the opening 7 of the front casing 2.

Figure 2:
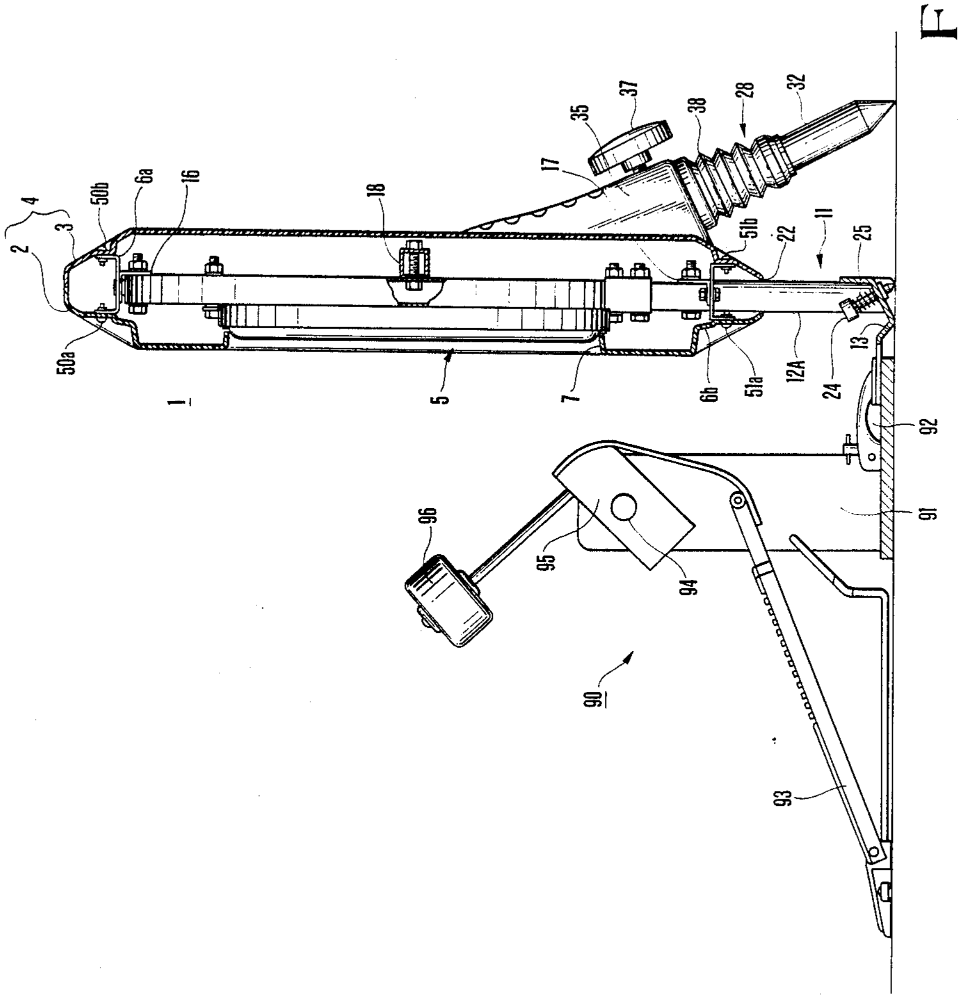
FIG. 2 is a longitudinal sectional view showing an electronic bass drum according to an embodiment of the present invention.
Figure 3:
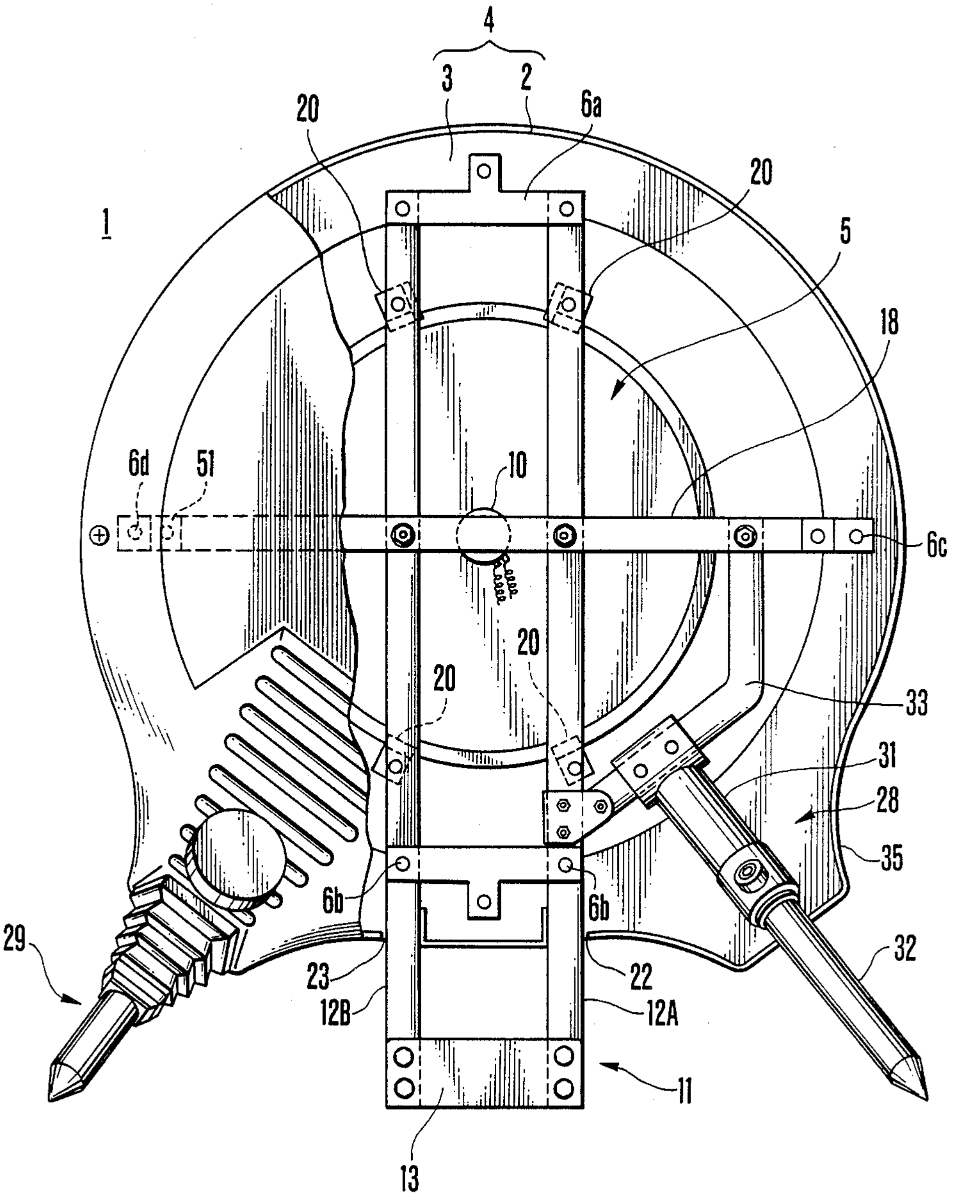
FIG. 3 is a partially cutaway view showing the main part of the back surface of the electronic bass drum shown in FIG. 2.
Figure 4:
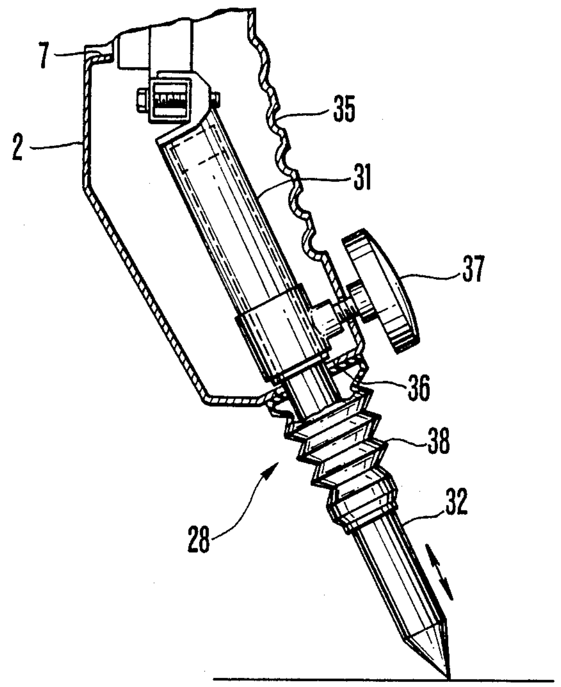
FIG. 4 is a partially cutaway, side view of rear leg portions shown in FIG. 2.
Figure 5:
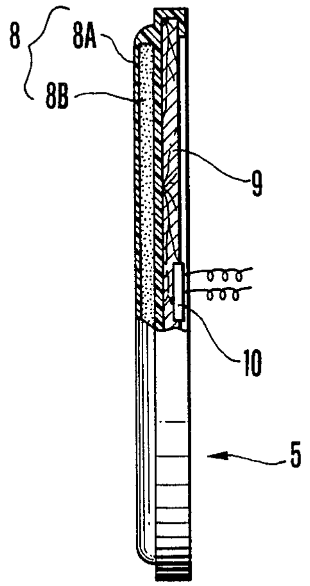
FIG. 5 is a partially cutaway, side view of a pad shown in FIG. 2.

The front leg 11 comprises a pair of support columns 12A and 12B which are inserted in the drum housing 4, are arranged symmetrically about a center O (FIG. 2) of the housing 4, and extend along their longitudinal direction, and a connecting plate 13 for connecting the lower end portions of the pair of support columns 12A and 12B. Each of the support columns 12A and 12B comprises a hollow pipe having a square cross section. The upper ends of the support columns 12A and 12B extend to the upper inner portion of the drum housing 4 to be connected through an L-shaped metal member 16 to the connecting metal member 6a for connecting the upper portions of the front and rear casings 2 and 3. The lower portions of the support columns 12A and 12B inside the housing 4 are connected to the connecting metal member 6a for connecting the lower portions of the front and rear casings 2 and 3 through an L-shaped metal member 17. The pair of support columns 12A and 12B are connected at the level of the center O by screws and a horizontal reinforcing member 18 extending in the left-and-right direction, i.e., in the direction perpendicular to the support columns 12A and 12B, thereby increasing the mechanical strength against a torsion of the columns 12A and 12B. The reinforcing member 18 also comprises a hollow pipe having a square cross sectional shape, as shown in FIG. 2, and each of its two ends is connected to one end of each of L-shaped metal members 50 and 51. The L-shaped metal members 50 and 51 are connected to connecting metal members 6c and 6d for connecting the left and right side portions of the front and rear casings 2 and 3. The pad 5 is mounted on the support columns 12A and 12B using a total of four substantially inverted L-shaped pad fixing metal members 20 (two for each of the support columns 12A and 12B). The four circumferential edge portions of the pad 5 are fixed to the support columns 12A and 12B by the metal members 20. The pair of left and right square holes 22 and 23 are formed in the lower junction surfaces of the front and rear casings 2 and 3. The lower end portions of the support columns 12A and 12B extend below the drum housing 4 throuh the square holes 22 and 23, respectively.

A fine adjusting screw 24 for finely adjusting a standing angle of the pad 5 or the drum housing 4 is provided to the connecting plate 13, and a spring 25 is fitted therearound in order to prevent the screw 24 from being loosened due to vibration.

A foot pedal device 90 shown in FIG. 2 is connected to the connecting plate 13. More specifically, a clamp mechanism 92 for clamping the connecting plate 13 is provided to the bottom portion of a U-shaped foot pedal frame 91. The player depresses a foot pedal 93 to rotate a cam 95 clockwise, which is fixed to a shaft 94 extending between portions of the frame 91. As a result, a beater 96 pivots clockwise, thereby beating the pad 5.

Since the pair of rear legs 28 and 29 have the same structure and are arranged symmetrically, the structure of one rear leg 28 will be described, and that of the other leg 29 will be omitted. The rear leg 28 consists of upper and lower pipes 31 and 32 and extends obliquely downward to form a substantially inverted V shape together with the other rear leg 29. The upper pipe 31 is housed in the lower right portion of the drum housing 4 in FIG. 3, and its upper end is rigidly fixed to a leg mounting member 33 by welding, a bolt, or the like. The leg mounting member 33 comprises a hollow square pipe, and its two ends are rigidly fixed to the support column 12A and the reinforcing member 18 by welding or a bolt. Note that the portion of the drum housing 4 storing the upper pipe 31 is bent at the same angle and in the same direction as those of the rear leg 28 to form a leg storing portion 35. The upper end portion of the lower pipe 32 is extendibly inserted in and connected to the upper pipe 31 through a pipe insertion hole 36 formed in the lower surface of the leg storing portion 35, and fixed thereto by a length-adjusting screw 37. Note that reference numeral 38 denotes an extendible cover.

Since the electronic bass drum of this embodiment has the above-mentioned arrangement, the drum housing 4 can be stably and reliably supported and can have sufficient load power against the beating force of the beater 96. More specifically, the front leg 11 is constituted by the pair of support columns 12A and 12B extending through the drum housing 4, and the pad 5 is fixed to these columns 12A and 12B. Therefore, the beating force of the beater 96 is entirely received by the supporting columns 12A and 12B, and a large stress will not act on the junction portion between the support columns 12A and 12B and the drum housing 4. Therefore, the front leg 11 will not be disengaged from the drum housing 4 and can stably support the drum housing 4. The leg 28 (and 29, also) is mounted on the leg mounting member 33, and is not mounted directly to the drum housing 4. Therefore, a large stress will not be act on the housing 4. As a result, the drum housing 4 does not require high rigidity and mechanical strength, resulting in low manufacturing cost.

Since the pad 5 has the foamed layer 8B, even if an unnecessary vibration from the front leg 11 is transmitted to the pad 5, the pad 5 itself can absorb the unnecessary vibration. Therefore, a produced sound will not be influenced by the unnecessary vibration.

In the electronic bass drum according to the present invention, as described above, since a front leg is constituted by support columns extending through a drum housing and a beaten member or a beater is mounted on the support columns, the beating force of the beater is entirely received by the support columns, thereby preventing the junction portion between the drum housing and the front leg from receiving a large stress. Therefore, the front leg can stably and reliably support the drum housing, and will not be disengaged. In addition, since the beaten member has a foamed layer, it can absorb an unnecessary vibration transmitted from the front leg, and a produced sound will not be influenced thereby, resulting in great practical advantage.

What is claimed is:

1. An electronic bass drum comprising:

supporting means for supporting said drum including a substantially vertical front supporter and a rear supporter having one end connected to said front supporter and another end extending obliquely downward;

pad means for producing a mechanical vibration, a back surface of which is attached to said front supporter and a front surface of which is to be struck by a player, said front supporter extending downward further than a lower edge of said pad means;

detecting means attached to said back surface of said pad means for detecting a mechanical vibration caused by a player's strike of said front surface of said pad means and for outputting a detection signal electrically representing said mechanical vibration; and an instrument housing attached to said supporting means that encloses at least a part of said supporting means and said pad means except for at least a part of said front surface.

2. A drum according to claim 1, wherein said front supporter comprises two front legs which are substantially parallel to each other, and a connecting plate for connecting lower ends of said front legs.

3. A drum according to claim 2, wherein said rear supporter comprises two rear legs.

4. A drum according to claim 2, wherein said connecting plate is connected to foot pedal means for striking said front surface of said pad means.

5. A drum according to claim 2 further comprising adjusting means for adjusting a standing angle of said pad means, said adjusting means mounted on said connecting plate.

6. A drum according to claim 3, wherein said rear legs include extension means for extending each of said rear legs to a predetermined length.

7. A drum according to claim 3, wherein said supporting means further comprises a horizontal supporter for reinforcing said front supporter, said horizontal supporter being connected to said front legs near a center of each and approximately perpendicular thereto.

8. A drum according to claim 7, further comprising two connecting members each extending between said horizontal supporter and one of said front legs, one end of each of said rear legs being connected to each of said connecting members.

* * * * *

UNITED STATES PATENT AND TRADEMARK OFFICE

CERTIFICATE OF CORRECTION

PATENT NO. : 4,732,070

DATED : 03/22/88

INVENTOR(S) : Yamashita

It is certified that error appears in the above-identified patent and that said Letters Patent is hereby corrected as shown below: On the title page

[73] Assignee delete "Nippon,Sakki,Seizo,Kabushiki, Kaisha, Hamamatsu,Japan"

insert --Nippon,Gakki,Seizo,Kabushiki, Kaisha, Hamamatsu,Japan--

Signed and Sealed this

Sixth Day of December, 1988

*Attest:*

DONALD J. QUIGG

*Attesting Officer*

*Commissioner of Patents and Trademarks*